July 8, 1941. H. L. KRAEFT 2,248,460
BICYCLE HEADLIGHT
Filed Nov. 18, 1938 3 Sheets-Sheet 1
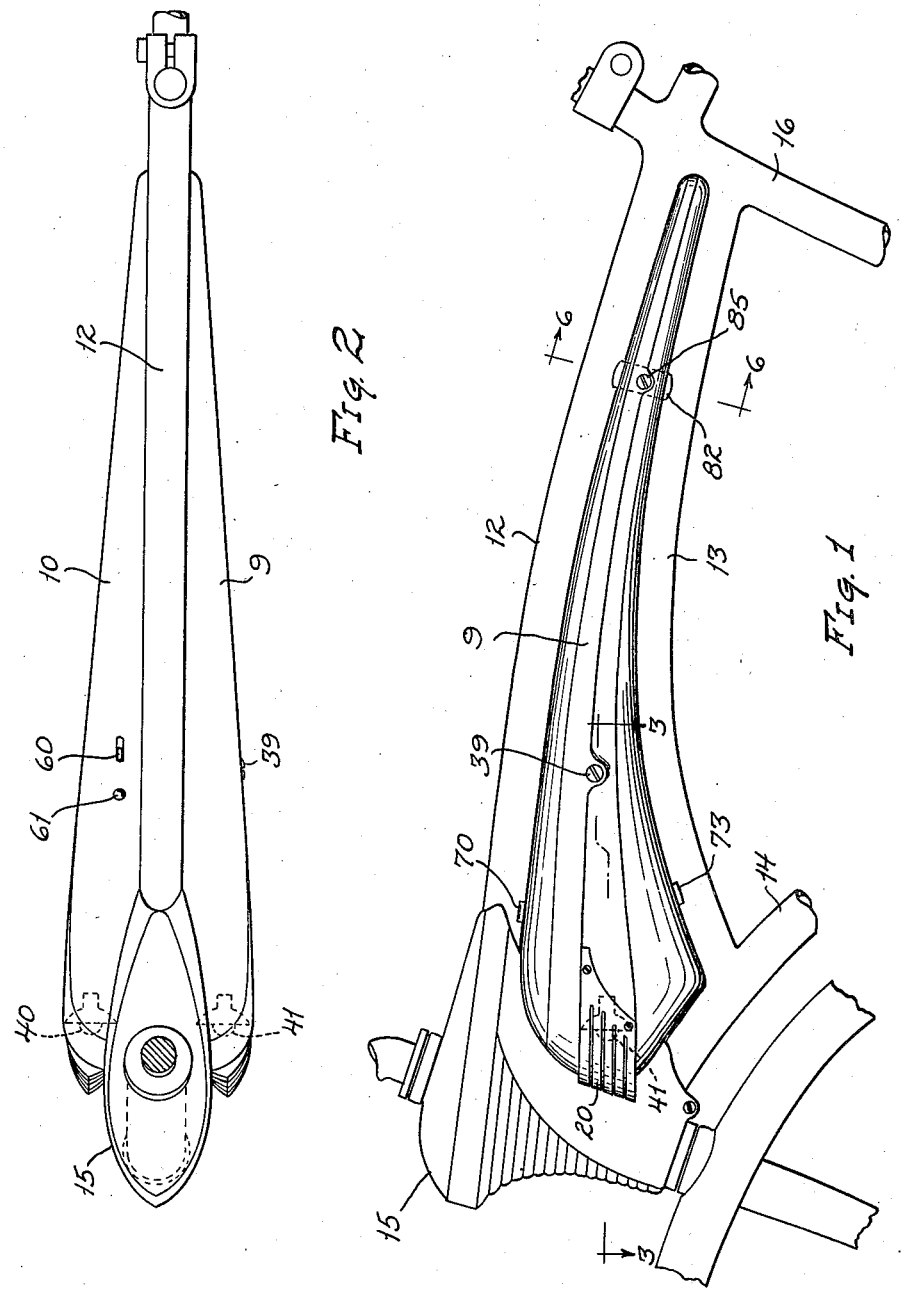
INVENTOR.
HERMAN L. KRAEFT
BY Bates, Goldrick & Teare
ATTORNEYS July 8, 1941.   H. L. KRAEFT   2,248,460
BICYCLE HEADLIGHT
Filed Nov. 18, 1938   3 Sheets-Sheet 2

INVENTOR.
HERMAN L. KRAEFT
BY Bates, Golrick & Teare
ATTORNEYS

July 8, 1941. H. L. KRAEFT 2,248,460
BICYCLE HEADLIGHT
Filed Nov. 18, 1938    3 Sheets-Sheet 3

INVENTOR.
HERMAN L. KRAEFT
BY Bates, Goldrick & Teare
ATTORNEYS

Patented July 8, 1941

2,248,460

UNITED STATES PATENT OFFICE 2,248,460

BICYCLE HEADLIGHT

Herman L. Kraeft, Cleveland Heights, Ohio, assignor to The Murray-Ohio Manufacturing Co., Cleveland, Ohio, a corporation of Ohio Application November 18, 1938, Serial No. 241,201

8 Claims. (Cl. 240—7.55)

The present invention is directed to improvements in headlight structures for bicycles, and the general object thereof is the provision of a headlight structure which may be incorporated within the bicycle frame, so as to be disposed rearwardly of the steering post of the frame and thereby be protected from damage caused by head-on collisions.

A further object of the present invention is the provision of a novel headlight construction, which may be mounted upon the bicycle frame at a position rearwardly of the steering post of the bicycle frame and cast parallel headlight beams from a position rearwardly of the steering post forwardly thereof.

A further object of the present invention is the provision of a novel battery and lamp assembly within the headlight casing, which can be firmly retained therein with adequate protection against shorting of the batteries in a simple manner.

Other objects of the present invention will become apparent from the following description, which refers to the accompanying drawings, the drawings illustrating a preferred embodiment of the invention.

Figure 3:
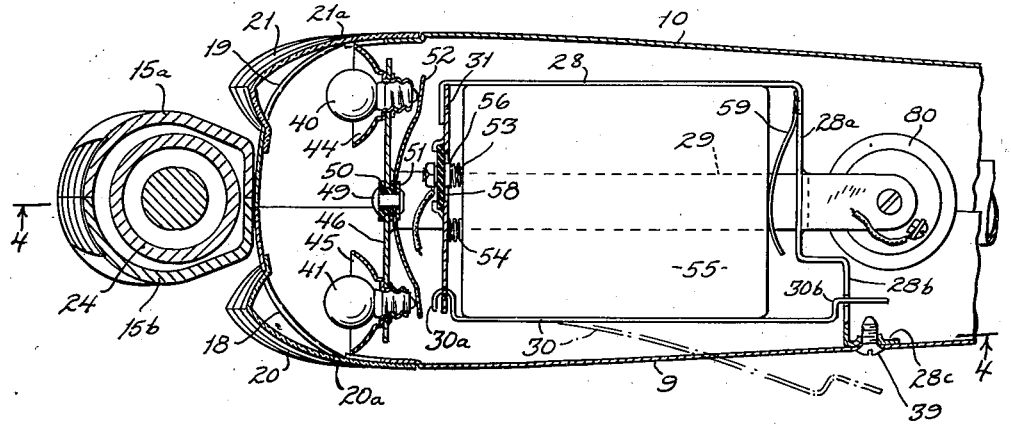
Figure 4:
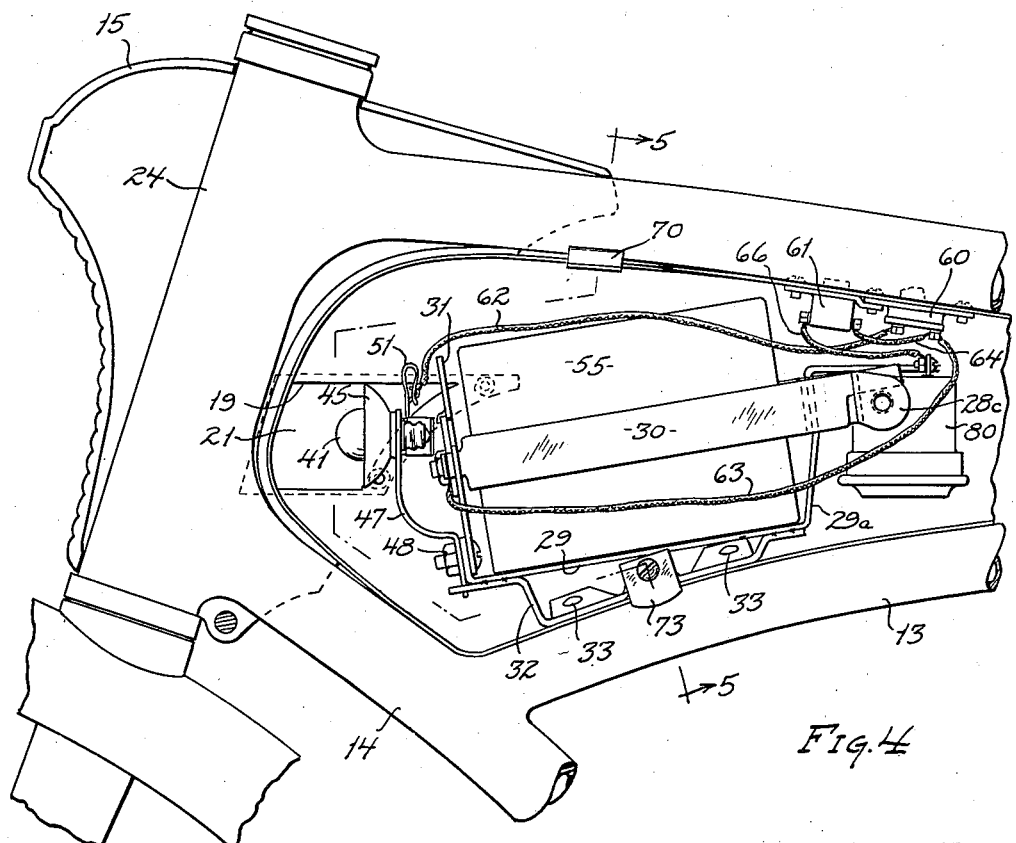
Figure 5:
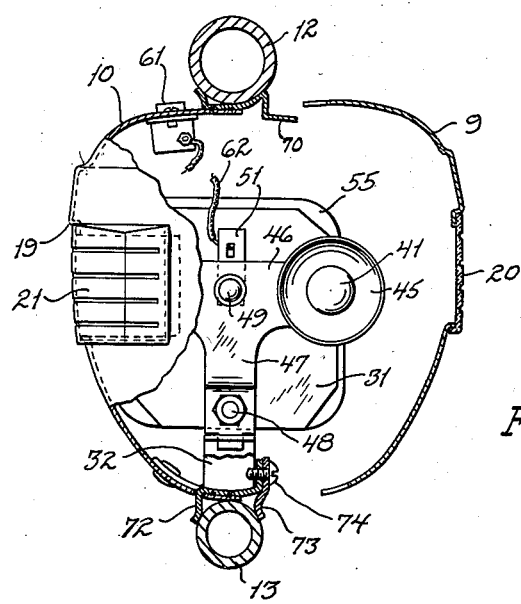
Figure 6:
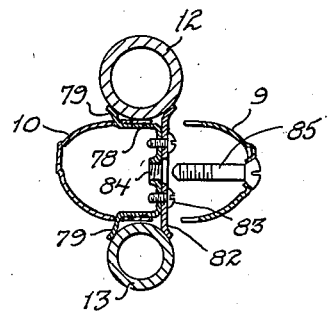

In the drawings, in Fig. 1 I show in side elevation the upper part of a bicycle frame, equipped with my headlight structure; Fig. 2 is a plan view of the upper part of the bicycle frame; Fig. 3 is a horizontal cross-sectional view, taken through the bicycle frame and lamp structure substantially along the line 3—3 of Fig. 1; Fig. 4 is a cross-sectional elevation of the forward part of the bicycle frame and lamp structure taken substantially along the line 4—4 of Fig. 3; Fig. 5 is a transverse cross-sectional view, taken through the forward part of the bicycle frame, through the lamp structure substantially along the line of 5—5 of Fig. 4; and Fig. 6 is a transverse cross-sectional view, taken through the rearmost part of the lamp casing substantially along the line 6—6 of Fig. 1.

My invention contemplates combining with the frames of bicycles of modern design, a lamp structure which can be disposed between the upper and lower reach bars of the bicycle frame and the steering post and seat post tubes thereof. The arrangement is such that the forward end of the lamp casing is bulged outwardly from a point immediately to the rear of the steering post of the bicycle frame on each side thereof, whereby the bulged portions may be provided with forwardly disposed light or beam openings on each side of the steering post, whereby a duplex headlight arrangement is provided at a protected point immediately above and to the rear of the center of the forward wheel of the bicycle.

Referring to the drawings, I show the headlight casing as comprising two complementarily formed metallic casing members 9 and 10, which are shaped to conform to an upper reach bar 12 and a lower reach bar 13 on the bicycle frame, the downwardly extending reach bar 14, and an ornamented steering post shroud, generally indicated by the reference numeral 15, whereby the space between the reach bars, if desired, may be completely enclosed by the lamp casing. At the forward end of the lamp casing members 9 and 10, I provide window or beam openings 18 and 19, in which are placed transparent prisms or lens 20 and 21, the latter being shaped to generally conform to the contour or shape of the forward ends of the lamp casing members 9 and 10. As shown in Fig. 3, the prism members 20 and 21 extend from a point immediately behind the steering post 24 of the bicycle frame, in juxtaposition to the rear wall of the steering post shroud members 15a and 15b, and these prism members may be formed of molded glass or any suitable transparent plastic material.

In the lamp construction shown in the drawings, the battery mounting and switch, and electrical connections are arranged in such manner that all of the same can be supported by or associated with one or the other of the lamp casing members 9 or 10, whereby when it is desired to have access to the interior of the lamp casing for the renewal of lamp bulbs, etc., such access may be gained without the necessity and annoyance of breaking any electrical connections.

To further this end, I provide a lamp casing holding means, which is secured directly to the reach bars of the bicycle frame. In Figs. 3 to 6, inclusive, such securing means are disclosed as comprising a bracket structure arranged to be disposed interiorly of the casing, near the forward end thereof, and a second bracket structure, such as is shown in Fig. 6, which may be disposed to react against the upper and lower reach bars near the rear end of the lamp casing.

The forwardly disposed bracket structure is associated with a battery holding means permanently secured to the lower part of the interior of the lamp casing member 10. The battery members are arranged in a composite cluster 55 comprising a series of battery cells side by side and disposed within a suitable container whereby the batteries may be handled as a unit. The battery holding means serves as a support for lamps 40 and 41, a horn mechanism 80 and as a bracket to which the lamp casing member 9 is removably attached, as will be described.

The battery holding means comprises an open frame work of flat steel strips 28, 29 and 30. The member 28 is attached at its forward end to a plate 31, as shown in Fig. 3, and its rear end is bent transversely and has an offset leg formation 28b with a perforated and threaded bracket portion 28c, to which the forward end of the casing member 9 is secured by screw members 39. The lower battery holding member 29 is welded to a bottom member 32, which is welded, at 33, to the inside surface of the lamp casing member 10. The member 29 is provided with a rearwardly extending bracket formation 29a, which supports the horn mechanism 80 and the forward end thereof is secured to the plate 31.

As shown in Fig. 3, the battery holding member 30 is looped at its forward end 30a, through a slot formed in the plate 31 and is spring-shaped when not in binding relation to the battery cluster 55. The rear end 30b comprises a latch which slips into a bayonet lock like formation, cut in the leg 28b of the member 28. Thus, the bottom stamped member 32 is welded to the inner bottom side of the lamp casing member 10, the battery holding member 29 is secured to the member 32, the plate member 31 is supported by the member 29, the battery holding member 28 secured to the plate member 31, and the battery clamping member 30 is in detachable engagement with the rear bracket formation 28b of the member 28, whereby the battery cluster 55 can be removed for replacement.

The lamps 40 and 41, as shown in Fig. 3, are disposed to the rear of the lens members 21 and 20, respectively, at each side of the steering post 24, and are supported respectively by combined socket and reflector members 44 and 45. The socket members 44 and 45 are supported by a transversely extending flat bar 46, having a vertical leg 47 attached to the forward end of the battery holding member 29 by a bolt and nut arrangement indicated at 48. A rivet 49 at the center of the cross-bar, and insulated from it by insulating means 50 secures a terminal clip 51 and a conductor spring member 52 in clamping engagement. The spring member 52 has two spring arms which contact with the central terminals of the lamp members 40 and 41. The battery terminals 53 and 54 comprise spring members which are urged into contact with terminal member 56 and the grounded plate 31, respectively, the terminal member being carried by an insulation member 58 mounted upon the forward plate 31 of the battery-holding means. The battery cluster 55 is maintained with its terminals in contact with the terminal member 56 and plate 31 by a spring member 59, which contacts the bottom of the battery cluster, and which is carried by the transversely extending portion 28a of the battery holding member 28.

Electrical connections to the lamps 40 and 41 and to the horn 80 are effected through switch 60 and push-button 61, respectively, as follows:

A conductor line 62 extends from the rivet 49, clip 51, and spring member 52 to the terminal on the switch member 60. When the switch is closed the circuit is completed by a line 63, which extends from the second terminal of the switch 60 to terminal 56, and by ground the circuit is completed, to the grounded terminal 54. The sounding device 80 is likewise energized through the line 63 and extension 64 to a terminal on the switch 61 and through a line 66 extending from a second terminal on the switch 61 to a connection on the sounding device 80. The sounding device is grounded to the battery holding means, whereby the circuit is completed through the grounded terminal 54.

I have provided a mounting means for the casing member 10, which carries the foregoing described illuminating and sounding mechanism which can be permanently attached to the upper reach bar 12 and the lower reach bar 13 adjacent the forward and rearward portions thereof, as shown in Figs. 5 and 6. In Fig. 5 I show a clamp member 70, which may be welded to the upper part of the casing member 10 and be of such shape as to embrace the lower outer side of the upper reach bar 12, and therebeneath I show a bracket member 72 welded to the lower inner side of the casing member 10, and extending through an opening formed therein to engage one side of the reach bar 13. A clamping member 73 secured by a screw member 74 to the bracket member 72 serves to firmly clamp the forward lower side of the casing member 10 to the lower reach bar 13. To the rear of the lamp casing I provide a U-shaped bracket member 78, which is suitably flanged as at 79 to extend through openings formed in the casing member 10 and engage the upper and lower reach bars 12 and 13, respectively. The clamping plate 82 serves to clamp the bracket member 78 to the reach bar through the medium of screw members 83. The clamping plate 82 is perforated centrally and the bracket member 78 is provided with an aligned, internally threaded bore 84 which receives a screw member 85, the latter screw member serving to clamp the rear end of the casing member 9 into firm engagement with the longitudinal edges of the casing member 10.

By constructing the headlight in the manner hereinbefore described, whereby it is adaptable for placement within the frame structure, I obtain a very compact headlight arrangement with the lens of the headlight disposed immediately to the rear of the steering post of the vehicle, and from which I obtain effective illumination by disposing headlights, lamps and reflectors at each side of the steering post structure, and if desired, the rearmost parts 21a and 20a of the lens members 21 and 20, may be colored red, whereby danger-light throwing sidewise beams may also be obtained. Accessibility to the interior of the lamp structure for the replacement of batteries or lamps can be conveniently obtained by removing the screws 39 and 85, thus permitting removal of the casing member 9, thus exposing the entire interior of the lamp casing member 10, without disturbing the battery support and wiring assembly of the headlight structure. The arrangement is such as to afford a compact, durable, tight-fitting headlight structure which does not interfere in any way with the comfort of the rider and the arrangement is such as to greatly facilitate the assembly of a number of comparatively small parts in an efficient manner.

I claim:

1. In combination with a bicycle frame, of a headlight structure comprising two stamped, elongated, metallic members forming a hollow body disposed between the steering post the top reach bar and a lower reach bar of the bicycle frame with the forward end of the body disposed rearwardly of the steering post, one of said body members being fixed to the frame and each of said members being bulged outwardly away from the steering post of the frame and having reflector equipped headlight windows formed in said outwardly bulged portions immediately adjacent the steering post, whereby a headlight beam may be directed through said opening forwardly of the steering post, a battery carried by the fixed member, dual illuminating means carried by one member and means connecting both of said illuminating means to the battery.

2. A headlight structure for a bicycle comprising a hollow, metallic body shaped to fit between the steering post a top reach bar and a lower reach bar on the bicycle frame immediately in the rear of the steering post, said body comprising two stamped members, means disposed interiorly of the body for holding the body in such position and each of said members having a headlight window formed in the forward end thereof and disposed rearwardly and at the side of the steering post of the bicycle frame when the headlight is mounted thereon, means for permanently securing one of said members to the bicycle frame, reflector means disposed within the body and illuminating means associated with the reflector means and each of the windows to direct a beam of light therethrough.

3. The combination with a bicycle frame, of a headlight structure comprising a hollow, metallic body disposed between the steering post the top reach bar and a lower reach bar of the bicycle frame with the forward end of the body disposed rearwardly of the steering post of the frame, said body being bulged outwardly from each side of the steering post of the frame and having reflector equipped headlight windows formed in said outwardly bulged portions immediately adjacent the steering post and extending into the side walls of the body, means covering the sidewise extending portions of said windows whereby headlight beams may be directed through said openings forwardly of the steering post and sidewise of the frame and illuminating means contained within said body, serving to cast forward and sidewise beams.

4. The combination with a bicycle frame, of a headlight structure comprising two stamped, elongated, metallic members forming a hollow body disposed between the steering post the top reach bar and a lower reach bar of the bicycle frame with the forward end of the body disposed rearwardly of the steering post, one of said body members being permanently fixed to the frame and each of said members being bulged outwardly away from the steering post of the frame and having reflector equipped headlight windows formed in said outwardly bulged portions immediately adjacent the steering post, whereby a headlight beam may be directed through said opening forwardly of the steering post, a battery and a pair of illuminating means carried by the fixed member and means connecting both of said illuminating means to the battery.

5. A headlight structure for a bicycle comprising a hollow, metallic body shaped to fit between the steering post, a top reach bar and a lower reach bar on the bicycle frame immediately in the rear of the steering post, said body comprising two complementarily formed members, means disposed interiorly of the body for engaging the reach bars of a bicycle frame to hold the body in such position and each of said members having a headlight window formed in the forward end thereof and disposed rearwardly and at the side of the steering post of the bicycle frame when the headlight is mounted thereon, a lamp associated with each of said windows and said windows extending partly along the sides of the casing, and reflector means associated with the lamp whereby side light beams, as well as headlight beams, may be projected through said windows.

6. The combination with a bicycle frame, of a headlight structure comprising a hollow, metallic body disposed between the steering post, the top reach bar and a lower reach bar of the bicycle frame with the forward end of the body disposed rearwardly of the steering post of the frame, means disposed within the body for securing the same to the reach bars of the bicycle frame, said body being bulged outwardly from each side of the steering post of the frame and having reflector equipped windows formed in said outwardly bulged portions immediately adjacent the steering post and extending into the side walls of the body, and means whereby headlight beams may be directed through said openings forwardly of the steering post and red beams sidewise of the frame and illuminating means contained within said body, serving to cast forward and sidewise beams.

7. In combination with a bicycle frame, of a twin headlight structure comprising a hollow, metallic body disposed between the steering post, the top reach bar and a lower reach bar of the bicycle frame, rearwardly of and immediately adjacent to the steering post, means disposed within the body for holding said body in such position, said body having reflector equipped headlight windows at each side of the steering post of the frame and immediately adjacent the steering post, and a unitary sub-assembly of parts disposed within the body comprising a battery holding means, lamps and reflectors and supports therefor disposed immediately to the rear of said windows.

8. A headlight structure for a bicycle comprising an elongated, hollow, metallic body shaped to fit between the steering post, the top reach bar and a lower reach bar of a bicycle frame, and having two headlight windows formed in the forward end thereof and disposed rearwardly and at each side of the steering post of the bicycle frame when the headlight is mounted thereon, reflector means associated with each of said windows and illuminating means disposed within the body, a battery and holding means therefor, and means associated with the battery holding means for attaching the body to the bicycle frame reach bars.

HERMAN L. KRAEFT.